(12) United States Patent
Matsuno

(10) Patent No.: US 7,048,117 B2
(45) Date of Patent: May 23, 2006

(54) OPTICAL DISC STORAGE APPARATUS

(76) Inventor: Akihisa Matsuno, 302-2475 St. Catherines Street, Vancouver, British Columbia (CA) V5T 3Y1

( * ) Notice: Subject to any disclaimer, the term of this patent is extended or adjusted under 35 U.S.C. 154(b) by 135 days.

(21) Appl. No.: 10/644,813

(22) Filed: Aug. 21, 2003

(65) Prior Publication Data
US 2005/0040056 A1    Feb. 24, 2005

(51) Int. Cl.
    *B65D 85/57*    (2006.01)
(52) U.S. Cl. .................. 206/308.1; 206/312; 211/40; 211/41.12
(58) Field of Classification Search ............ 206/308.1, 206/309–313, 303, 493, 806; 211/40, 41.12
    See application file for complete search history.

(56) References Cited

U.S. PATENT DOCUMENTS

| | | | | |
|---|---|---|---|---|
| 2,773,727 | A * | 12/1956 | Bradley ................ | 312/9.9 |
| 2,922,527 | A * | 1/1960 | Finn ..................... | 211/40 |
| 4,613,044 | A | 9/1986 | Saito et al. | |
| 4,736,840 | A | 4/1988 | Deiglmeier | |
| 4,771,890 | A * | 9/1988 | Hofland et al. ......... | 206/445 |
| 4,998,618 | A | 3/1991 | Borgions | |
| 5,011,010 | A | 4/1991 | Francis et al. | |
| 5,168,991 | A | 12/1992 | Whitehead et al. | |
| 5,205,405 | A | 4/1993 | O'Brien et al. | |
| 5,232,275 | A * | 8/1993 | Yamazoe ............... | 312/9.58 |
| 5,417,323 | A * | 5/1995 | Presnick .............. | 206/309 |
| 5,423,434 | A * | 6/1995 | Chen .................... | 211/40 |
| 5,425,451 | A | 6/1995 | Blase | |
| 5,590,768 | A | 1/1997 | Hilton et al. | |
| 5,848,688 | A * | 12/1998 | Paloheimo ........... | 206/308.1 |
| 6,644,482 | B1 * | 11/2003 | Ku ....................... | 211/40 |
| 6,752,266 | B1 * | 6/2004 | Ku ....................... | 206/308.1 |
| 2002/0185393 | A1 | 12/2002 | Taguchi et al. | |
| 2002/0189960 | A1 | 12/2002 | Bard | |
| 2002/0195409 | A1 | 12/2002 | Ku | |

OTHER PUBLICATIONS

International Search Report, PCT/CA2004/001521, Jan. 14, 2005.
Written Opinion of the International Searching Authority, PCT/CA2004/001521, Jan. 14, 2005.

* cited by examiner

*Primary Examiner*—Jila M. Mohandesi
(74) *Attorney, Agent, or Firm*—Oyen Wiggs Green & Mutala LLP

(57) ABSTRACT

A container for housing optical discs includes a base and a lid. The disc is housed between the base and the lid. The base may have a retainer for releasably holding an optical disc against a surface thereof. The lid is pivotally coupled to the base by a pivot joint which permits pivotal motion of the lid relative to the base about a pivot axis that is substantially orthogonal to the plane of the disc. The container also includes a hook for coupling the container to a rod. The hook may be formed on a perimeter edge of at least one of the base and lid. The inwardmost end of the hook may terminate within the pivot joint.

32 Claims, 12 Drawing Sheets

OPTICAL DISC STORAGE APPARATUS

TECHNICAL FIELD

The invention relates generally to apparatus for housing, storing, transporting and/or protecting individual and multiple optical discs.

BACKGROUND

Optical disc media is used to store data in various formats, which may be read by optical means (e.g. laser reading head(s)). For example, optical discs may include digital video discs (DVD's), audio compact discs (CD's), video compact discs (VCD's), super video compact discs (SVCD's), writeable compact discs (CDR's), re-writeable compact discs (CDRW's) and the like. The term "optical disc(s)" is used in this description and the accompanying claims to include any such optical storage media.

Optical discs are generally sensitive to physical contact, which may cause abrasion, bending and impact damage, for example. Optical discs may also be sensitive to other environmental factors, such as temperature, which may cause warping of the disc. Optical discs may also be sensitive to contaminants, such as dust, dirt and oil, for example. To protect optical discs and the data contained thereon, it is generally desirable to house individual optical discs in protective containers when the optical discs are not in use.

Patents related to optical disc storage containers include:
U.S. Pat. No. 4,613,044 (Saito et al.);
U.S. Pat. No. 4,736,840 (Deiglmeier);
U.S. Pat. No. 4,998,618 (Borgions);
U.S. Pat. No. 5,011,010 (Francis et al.);
U.S. Pat. No. 5,168,991 (Whitehead et al.);
U.S. Pat. No. 5,205,405 (O'Brien et al.); and
U.S. Pat. No. 5,425,451 (Blase).

In addition to providing containers for individual optical discs, it is desirable to provide containers for multiple optical discs.

It is also desirable to provide apparatus for storage and/or transport of multiple optical discs and their containers. Prior art techniques for storing multiple optical discs typically involve resting a flat edge of the individual optical disc containers on a shelf of some type.

SUMMARY OF THE INVENTION

One aspect of the invention provides a container for housing optical discs. The container comprises a base and a lid. An optical disc may be housed between the base and the lid. The base may comprise a retainer for releasably holding an optical disc against a surface thereof. The lid is pivotally coupled to the base by a pivot joint, which permits pivotal motion of the lid relative to the base about a pivot axis that is substantially orthogonal to the plane of the disc.

The container also comprises a hook which may be used to couple the container to a rod. The hook may be formed on a perimeter of the lid, the base or both the lid and the base. Alternatively, the hook may be formed by a hook member. The hook may comprise a finger that extends around a portion of the pivot joint. An edge of the finger may define an inwardly extending channel which leads towards the pivot joint and terminates in a bore located within the pivot joint. The width of the bore may be greater than the width of the channel immediately outside of the bore.

The pivot joint may comprise a semi-annular lid member which extends from the lid towards the base in a direction parallel to the pivot axis and a semi-annular base member that extends from the base towards the lid in a direction parallel with the pivot axis. The semi-annular lid and base members may be slidably coupled to one another to enable pivotal movement of the lid with respect to the base. The pivot joint may have a bore through its center. An edge of the bore may be formed by the semi-annular base member and/or the semi-annular lid member. The bore may be semi-circular in shape. One of the lid or the base may have a semi-annular groove that receives the semi-annular member from the opposing one of the lid or the base. The semi-annular member may have a flange and the semi-annular groove may have a corresponding notch which receives the flange and prevents the lid from inadvertently coming apart from the base.

Some embodiments of the container comprise a latch mechanism for maintaining the lid in a closed pivotal orientation with respect to the base. The latch mechanism may comprise one or more protrusions on the lid (or the base) which project into one or more corresponding indentations on the base (or the lid) when the lid is in the closed pivotal orientation.

Some embodiments of the container comprise a pivot joint locking mechanism for preventing pivotal movement of the lid with respect to the base. The pivot joint locking mechanism may comprise a shaft, which is slideable to a locking position where a portion of the shaft projects into the pivot joint to prevent pivotal movement of the lid with respect to the base.

Another aspect of the invention provides apparatus for storage and/or transport of optical disc containers. The apparatus comprise one or more rods onto which the optical disc containers may be mounted by coupling the hook to the rod.

Further applications of the invention and features of specific embodiments of the invention are described below.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention relates to containers for housing, storing, transporting and/or protecting one or more individual optical discs. In accordance with one aspect of the invention, a container comprises a base and a lid which are coupled at a pivot joint for pivotal movement relative to one another. When an optical disc is placed between the base and the lid, the lid may be pivoted (relative to the base) to a closed configuration, where the optical disc is encased within the container. The lid may also be pivoted through a range of open configurations, where the optical disc is exposed for removal from the base by a user. The container also comprises a hook. The lid and the base of the container may be shaped to provide the hook on an outer periphery of the container. Alternatively the hook may be provided by a hook member which may be coupled to the lid, the base or to the pivot joint between the lid and base. Preferably, the hook comprises a finger which at least partially surrounds the pivot joint. The hook is removably engageable with a rod member to store one or more containers in a variety of storage and/or transport apparatus.

Figure 1:
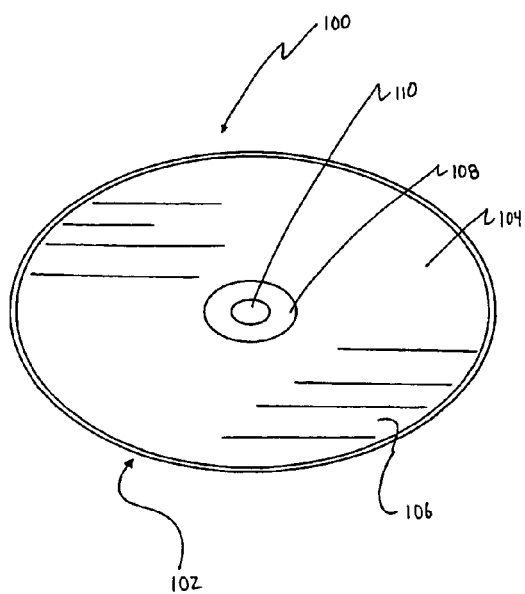
FIG. 1 depicts a typical optical disc.

FIG. 1 shows a typical substantially planar optical disc 100, which comprises a data bearing side 102 and a non-data bearing side 104. Data bearing side 102 comprises optically readable data (not shown) in a data bearing region (not shown). Disc 100 also comprises an annular non-data bearing region 108 which surrounds and is concentric with central bore 110. The non-data bearing side 104 of optical disc 100 may comprises a label or decal 106. Such a label may include information and/or graphics which relate to the contents of the data stored in the data bearing region of disc 100.

Figure 3:
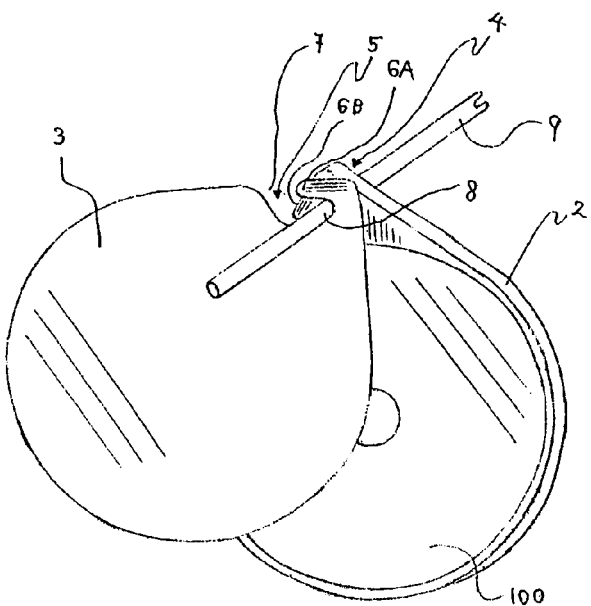
FIG. 3 shows how the FIG. 2 container may be coupled to a rod.
Figure 2:
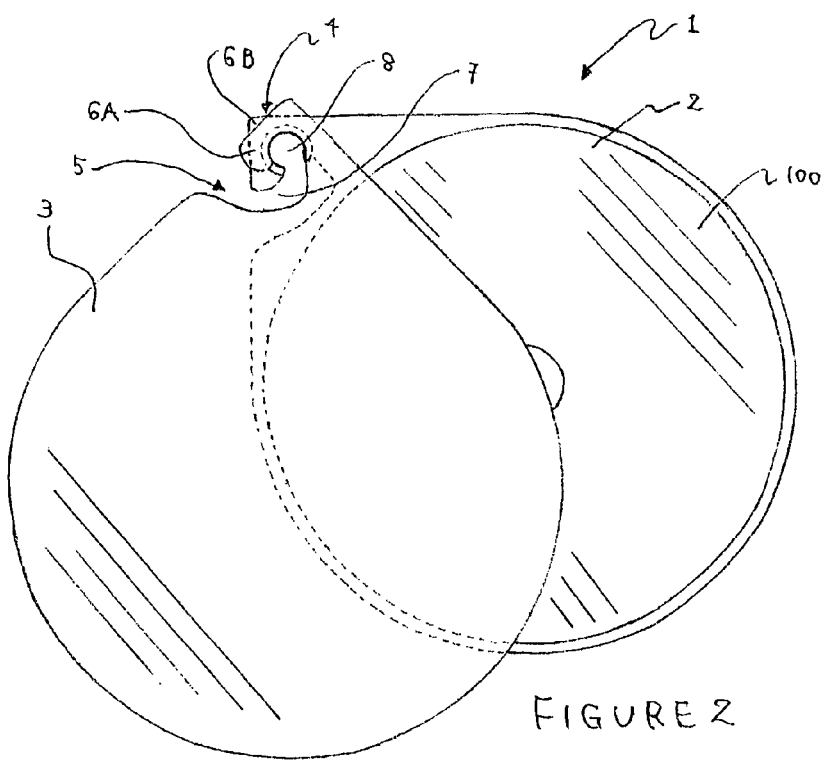
FIG. 2 is a plan view of an optical disc container according to a particular embodiment of the invention in a partially open configuration.
Figure 21:
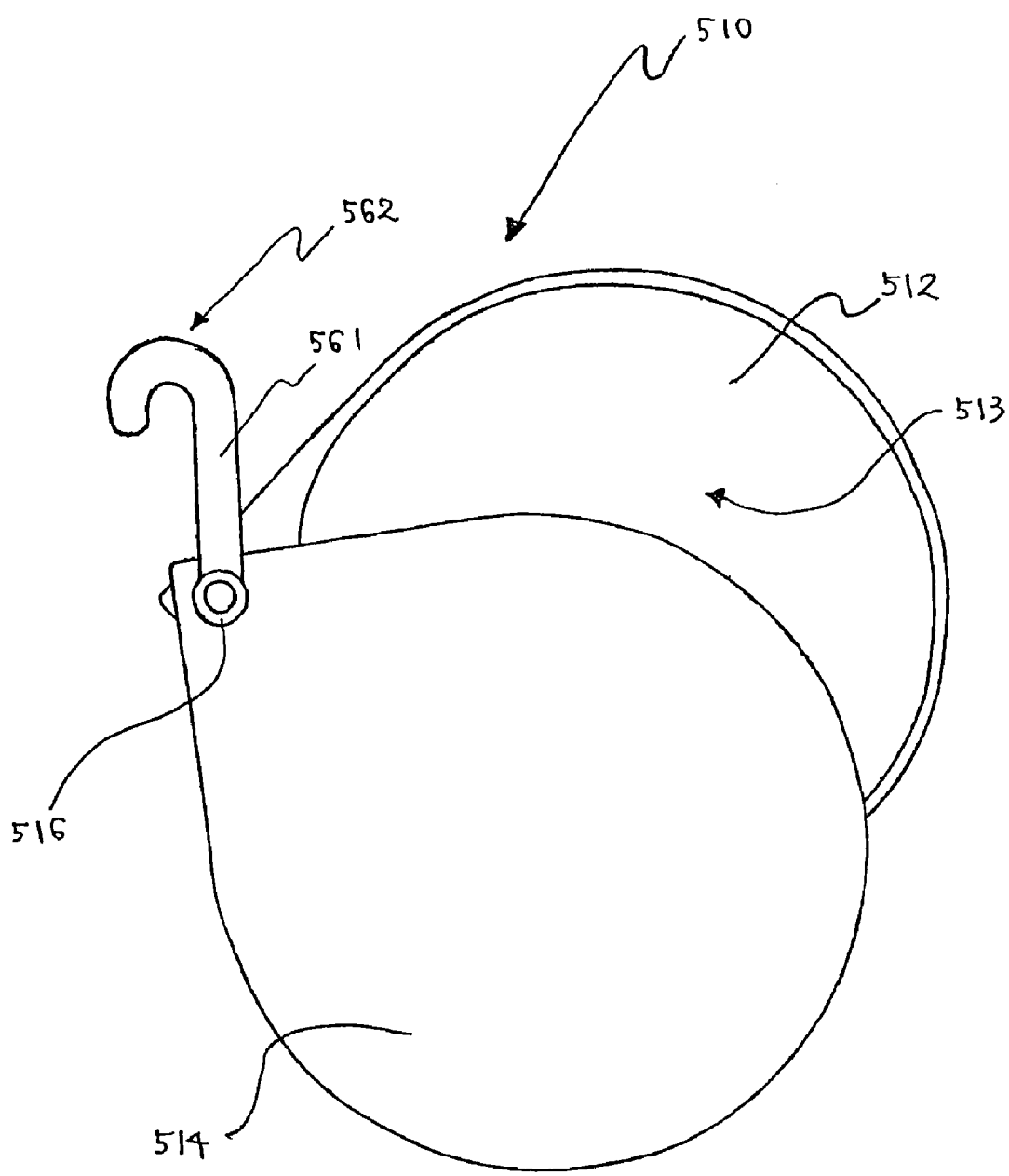
FIG. 21 is a plan view of an optical disc container according to another particular embodiment of the invention in a partially open configuration.

FIGS. 2, 3 depict an optical disc container 1 according to a particular embodiment of the invention. FIGS. 10–15 depict various views of an optical disc container 10 according to a different embodiment of the invention. FIG. 21 depicts an optical disc container 510 according to another embodiment of the invention. A number of directional conventions are employed in this description and the accompanying claims to help clarify their meaning. Referring to FIGS. 2, 10, 11 and 21 and to containers 1, 10 and 510 depicted therein:

(i) "upward", "upwardly", "upwardmost", "top" and similar words refer to a direction extending out of the page toward the reader;

(ii) "downward", "downwardly", "downwardmost", "bottom", "lower", "lowermost" and similar words refer to a direction extending out of the page away from the reader;

(iii) "vertical", "vertically" and similar words refer to either of the upward or downward directions;

(iv) "inward", "inwardly" and similar words refer to any direction which extends from a perimeter of containers 1, 10, 510 towards an interior of containers 1, 10, 510; and (v) "outward", "outwardly" and similar words refer to any direction which extends from the interior of containers 1, 10, 510 towards the perimeter of containers 1, 10, 510.

Those skilled in the art will appreciate that the particular manner in which the containers are depicted and described is a matter of convenience and that the directional words used in this description and in the accompanying claims should not be interpreted narrowly. In addition to these directional words, the words "semi-annular" and "semi-circular", as used in this description and the accompanying claims, refer respectively to any portion of an annulus and any portion of a circle. These words are specifically not limited to half of an annulus and half of a circle.

FIGS. 2 and 3 depict an optical disc container 1 according to a particular embodiment of the invention. In FIG. 2, container 1 is in a partially open configuration. A substantially planar optical disc 100 may be housed in container 1 between base 2 and lid 3. Base 2 is pivotally coupled to lid 3 at pivot joint 4, which allows lid 3 to be pivoted relative to base 2. The pivot axis of pivot joint 4 is substantially orthogonal to the plane of optical disc 100. In the illustrated embodiment, the pivot axis of pivot joint 4 is substantially orthogonal to the page. Preferably, as shown most clearly in FIG. 2, pivot joint 4 provides a bore 8 at or near its center.

Container 1 also comprises a hook 5 formed in at least one of its perimeter edges. In the illustrated embodiment, hook 5 is formed by a finger 6A on a perimeter edge of lid 3 and a finger 6B on a perimeter edge of base 2. Fingers 6A, 6B of hook 5 define a channel 7 which leads inward and terminates at bore 8. As shown in FIG. 3, hook 5 enables container 1 to be coupled to a rod 9 by inserting rod 9 into channel 7 and bore 8. Because bore 8 is located within pivot joint 4, lid 3 may still be pivoted relative to base 2 when hook 5 is coupled to rod 9. This location of bore 8 within pivot joint 4 allows disc 100 to be inserted and/or removed from container 1 without uncoupling container 1 from rod 9 (see FIG. 3).

Because of hook 5, optical disc container 1 may be coupled to rods in a wide variety of transportation and storage apparatus. FIGS. 4–9 show various transportation and storage apparatus that take advantage of this feature to store, transport and/or protect optical discs in accordance with the invention.

Figure 4:
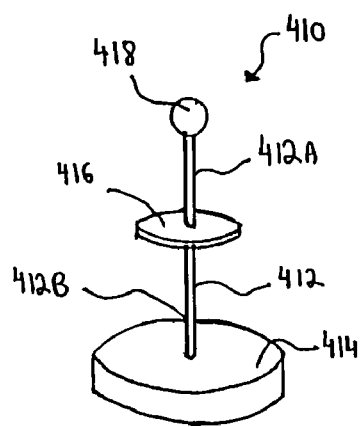
FIG. 4 is an isometric view of a particular embodiment of a multiple disc storage apparatus that may be used to store one or more optical disc containers in accordance with the invention.

FIG. 4 depicts a first storage mechanism 410 which comprises a base 414 and a vertically oriented rod 412. Optical disc containers may be hooked to vertical rod 412, such that their bases are oriented in a substantially horizontal direction. Rod 412 may optionally be divided into two or more component rods by interposing one or more platforms between the component rods. In the illustrated embodiment, rod 412 is divided into two component rods 412A, 412B by intermediate platform 416. Storage mechanism 410 may be provided with a stopping element 418 at the uppermost end of rod 412 to prevent optical disc containers from sliding off of rod 412. Stopping elements similar to stopping element 418 may be positioned at other location(s) on rod 412 to prevent optical disc containers from sliding thereon.

Figure 5:
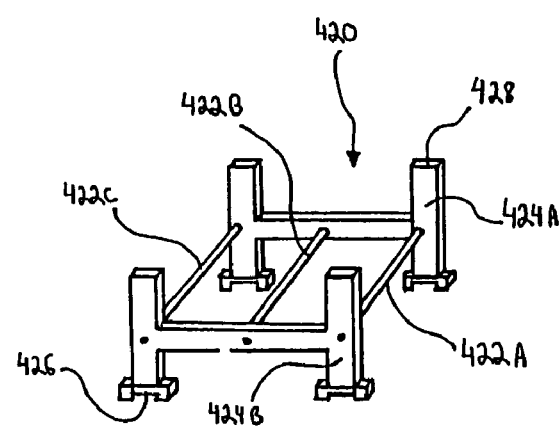
FIG. 5 is an isometric view of a particular embodiment of a multiple disc storage apparatus that may be used to store one or more optical disc containers in accordance with the invention.

FIG. 5 depicts another storage mechanism 420 which comprises a plurality of vertically oriented support members 424A, 424B, which support a plurality of horizontally oriented rods 422A, 422B, 422C. Optical disc containers may be hooked to rods 422A, 422B, 422C, such that their bases are oriented in a substantially vertical direction. Support members 424A, 424B may comprise modular components 426, 428 at their uppermost and lowermost extent, such that a plurality of storage mechanisms similar to storage mechanism 420 may be stacked on top of one another to provide increased storage capacity.

Figure 6:
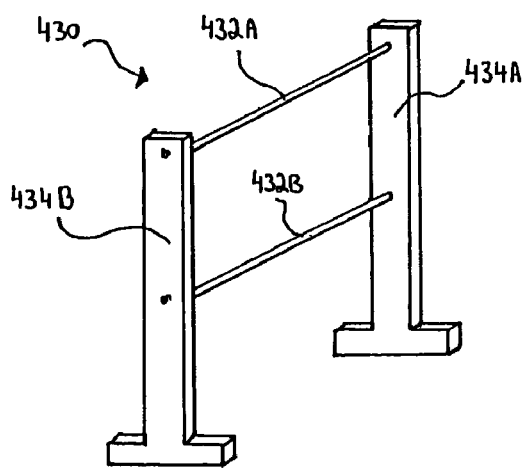
FIG. 6 is an isometric view of a particular embodiment of a multiple disc storage apparatus that may be used to store one or more optical disc containers in accordance with the invention.

FIG. 6 depicts another storage mechanism 430 which comprises a plurality of vertically oriented support members 434A, 434B which support a plurality of horizontally oriented rods 432A, 432B. Rods 432A, 432B are spaced apart vertically from one another. Optical disc containers may be hooked to rods 432A, 432B, such that their bases are oriented in a substantially vertical direction. Although not illustrated, storage mechanism 430 may be made modular, such that other storage mechanisms similar to storage mechanism 430 may be stacked thereupon to add additional disc storage capacity.

Figure 7:
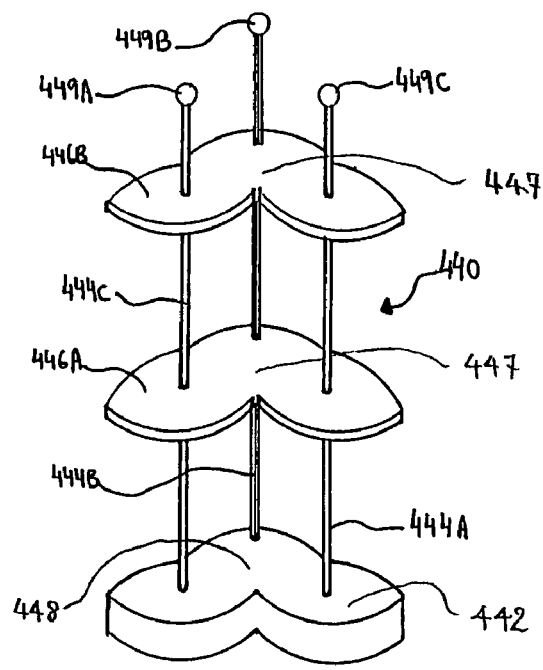
FIG. 7 is an isometric view of a particular embodiment of a multiple disc storage apparatus that may be used to store one or more optical disc containers in accordance with the invention.

FIG. 7 depicts another storage mechanism 440 which comprises a horizontally oriented base 442 and a plurality of vertical rods 444A, 444B, 444C. Optionally, as shown in the illustrated embodiment, one or more horizontally oriented intermediate platforms 446A, 446B may be located at vertically spaced apart positions along the length of rods 444A, 444B, 444C. Optical disc containers having hooks may be housed by storage mechanism 440 by hooking the containers to any one of rods 444A, 444B, 444C, such that their bases are oriented in a substantially horizontal direction. In addition, conventional optical disc containers without hooks may be housed by storage mechanism 440. Such conventional optical disc containers may be stacked in a horizontal orientation between rods 444A, 444B, 444C in region 448 of base 442 or regions 447A, 447B of platforms 446A, 446B. Storage mechanism 440 may be provided with stopping elements 449A, 449B, 449C which, in the illustrated embodiment, are positioned at the uppermost ends of rods 444A, 444B, 444C to prevent optical storage discs from sliding off of rods 444A, 444B, 444C. Stopping elements similar to stopping elements 449A, 449B, 449C may be located at other positions on rods 444A, 444B, 444C to prevent optical discs from sliding thereon.

Figure 8:
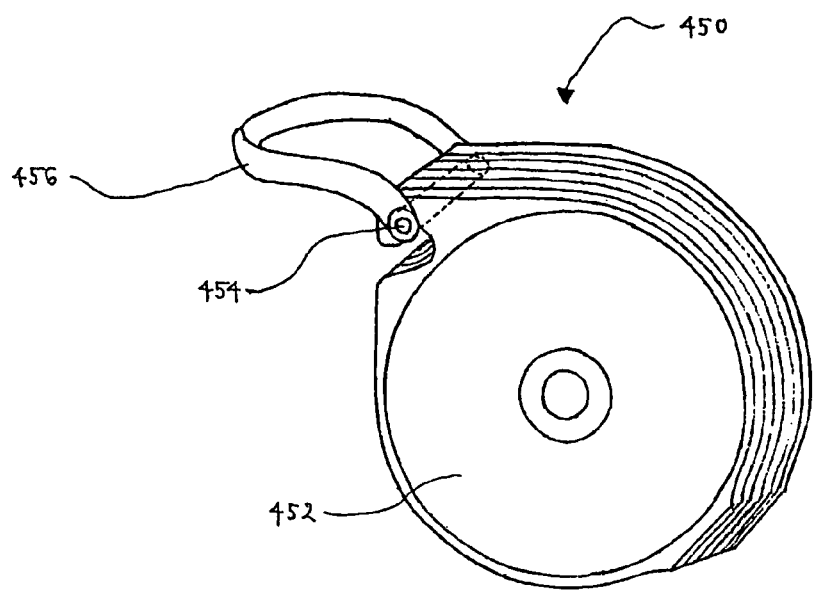
FIG. 8 is a isometric view of a carrying handle which may be used to transport one or more optical disc containers in accordance with the invention.

FIG. 8 depicts an optical disc transportation apparatus 450, which comprises a rod 454 and a handle 456 coupled to rod 454 at either end thereof. One or more optical disc containers 452 may be hooked to rod 454. A user may carry transportation apparatus 450 using handle 456. Transportation apparatus 450 may comprise a pair of stopping elements (not shown) which may be positioned along the length of rod 454 to prevent movement of optical disc containers 452 thereon.

Figure 9:
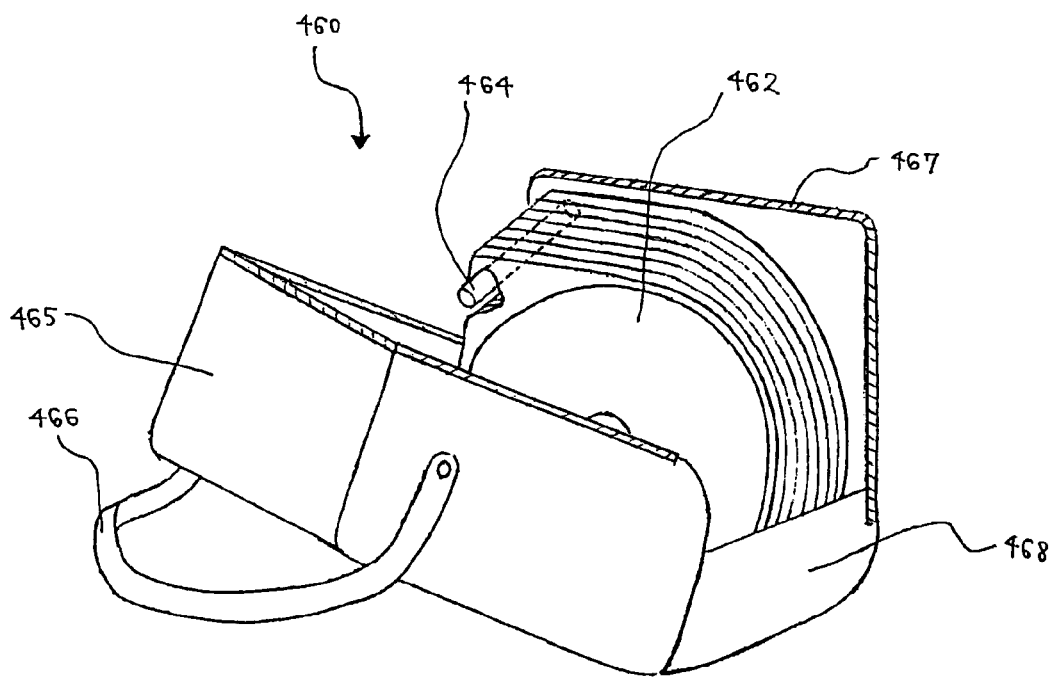
FIG. 9 is an isometric view of a multiple disc carrying case that may be used to store and/or transport one or more optical disc containers in accordance with the invention.

FIG. 9 depicts an optical disc transportation apparatus 460 which comprises a bag 468 having a handle 466 and a rod 464. One or more optical disc containers 462 may be hooked to rod 464 such that optical disc containers are housed inside bag 468. Bag 468 may comprise a lid 465, which may be closed using fastening element 467. Fastening element may comprise one or more hook and loop fasteners or zippers, for example.

Those skilled in the art will appreciate that there are many alternative storage and transportation apparatus comprising rods to which optical disc container 1 may be coupled by hook 5. The invention should be understood to incorporate any such apparatus.

Figure 10:
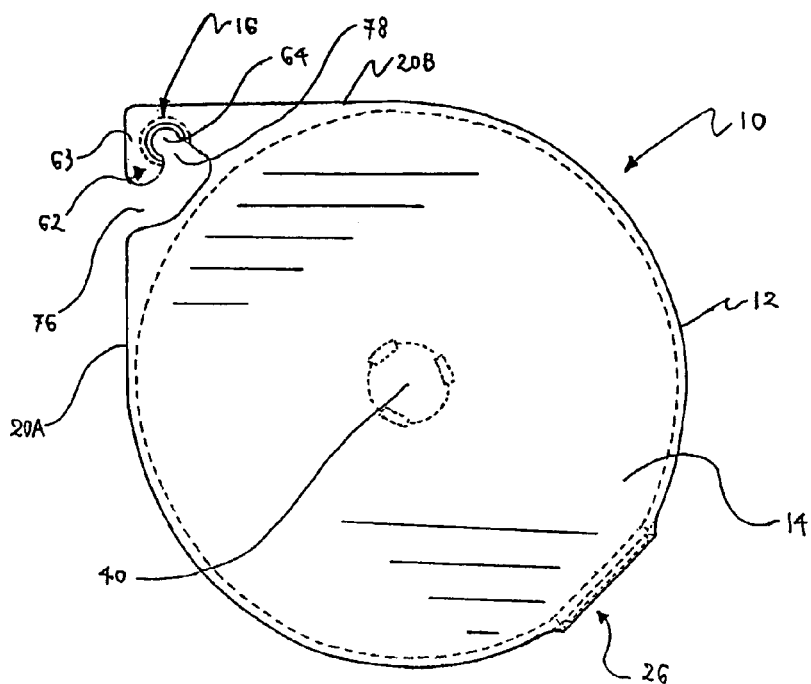
FIG. 10 is a plan view of an optical disc container according to a particular embodiment of the invention in its closed configuration.
Figure 11:
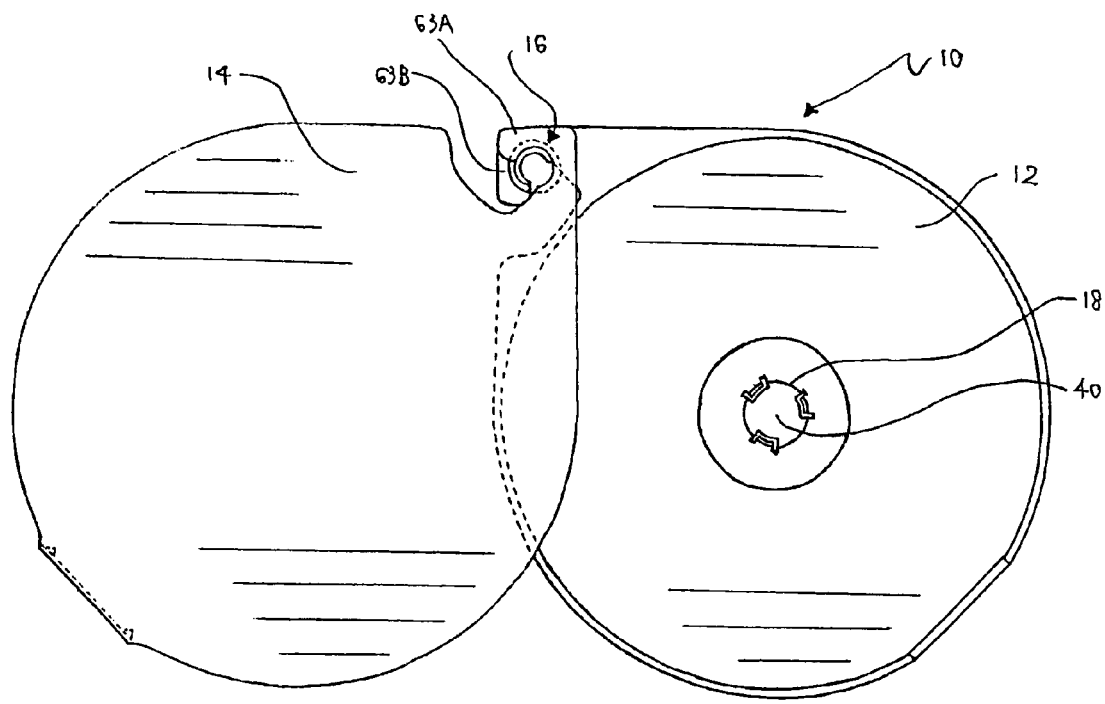
FIG. 11 is a plan view of the FIG. 10 container in an open configuration.

FIGS. 10–15 depict a container 10 according to another particular embodiment of the invention. FIG. 10 shows a top plan view of container 10 in its closed configuration. A substantially planar optical disc 100 (FIG. 1) may be encased between base 12 and lid 14. Preferably, optical disc 100 is removably held in base 12 via its central bore 110 by disc retainer 18. Base 12 is pivotally coupled to lid 14 at pivot joint 16. Pivot joint 16 preferably enables lid 14 to be pivoted about pivot axis 16A (FIG. 15) through 360 degrees relative to base 12, providing optical disc container 10 with a wide range of open configurations. FIG. 11 depicts container 10 in a particular open configuration, wherein lid 14 is pivoted relative to base 12, such that optical disc 100 may be disengaged from retainer 18 and removed from between lid 14 and base 12. Container 10 also comprises a hook 62 which may be used to hang container 10 from a rod (not shown) or to otherwise couple container 10 to a rod. In the illustrated embodiment, hook 62 comprises a semi-circular shaped central bore 64 defined by finger 63, which at least partially surrounds pivot joint 16.

Figure 13A:
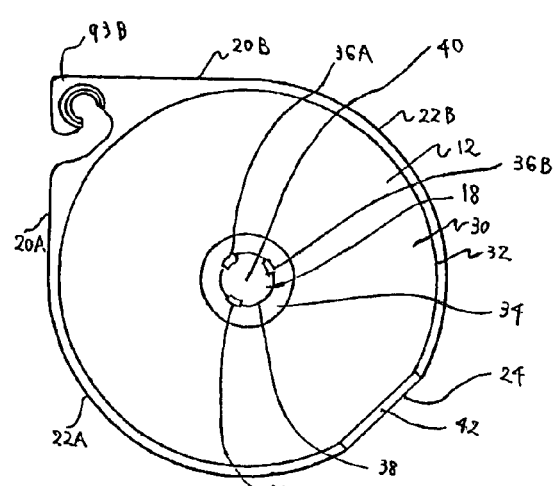
FIGS. 13A and 13B are respectively top and bottom plan views of a base of the FIG. 10 container.
Figure 13B:
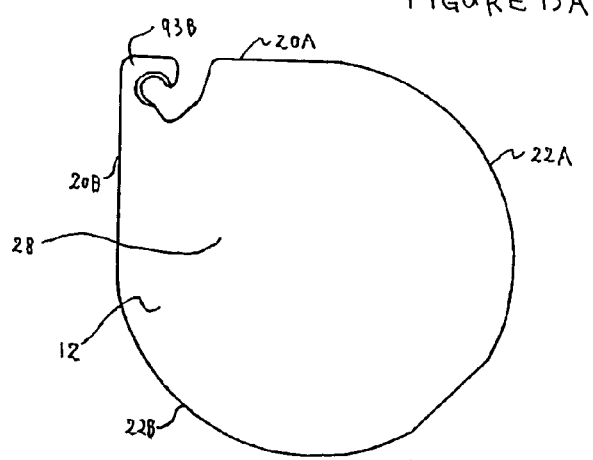
Figure 14:
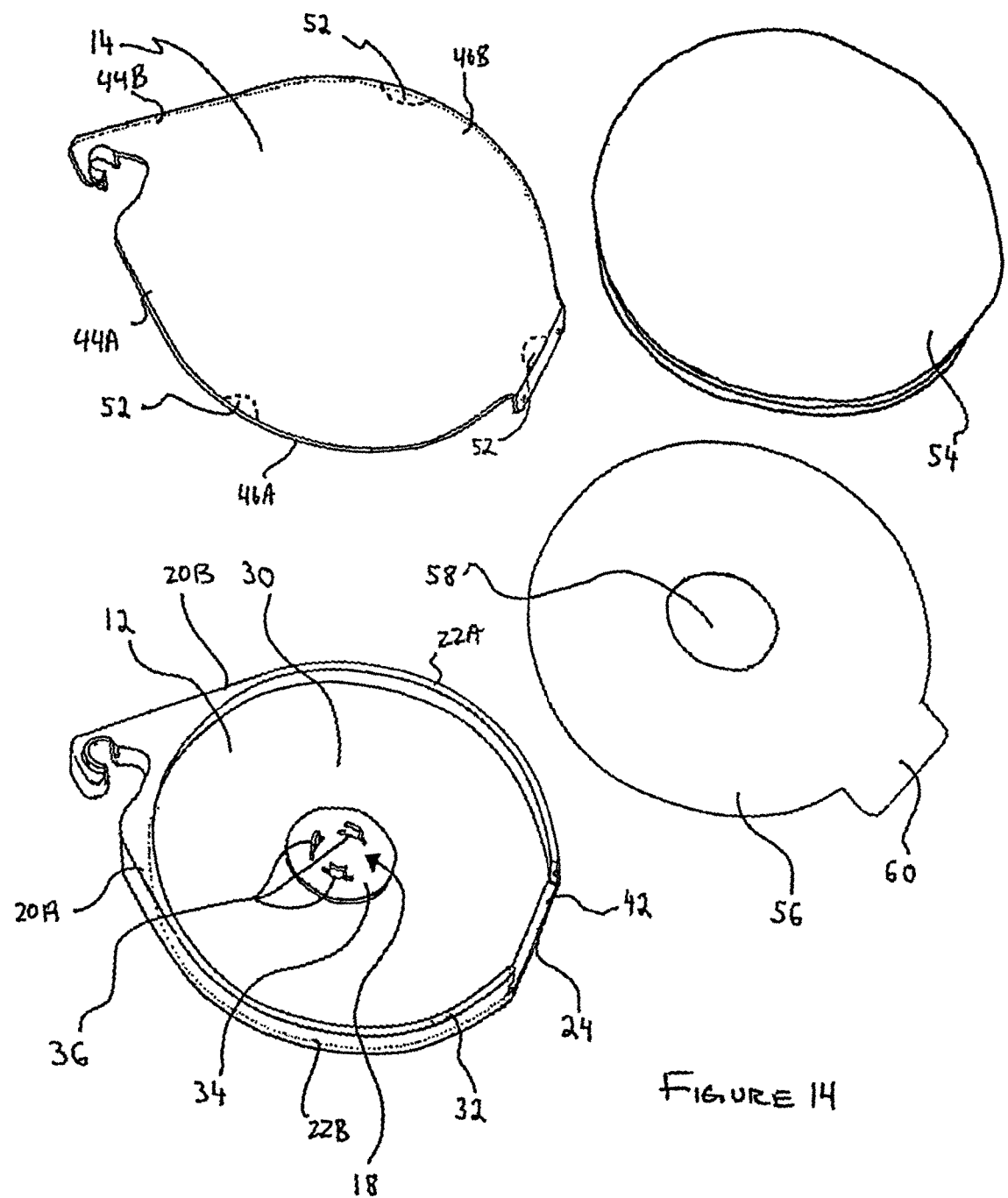
FIG. 14 is an exploded isometric view of the FIG. 10 container.
Figure 15:
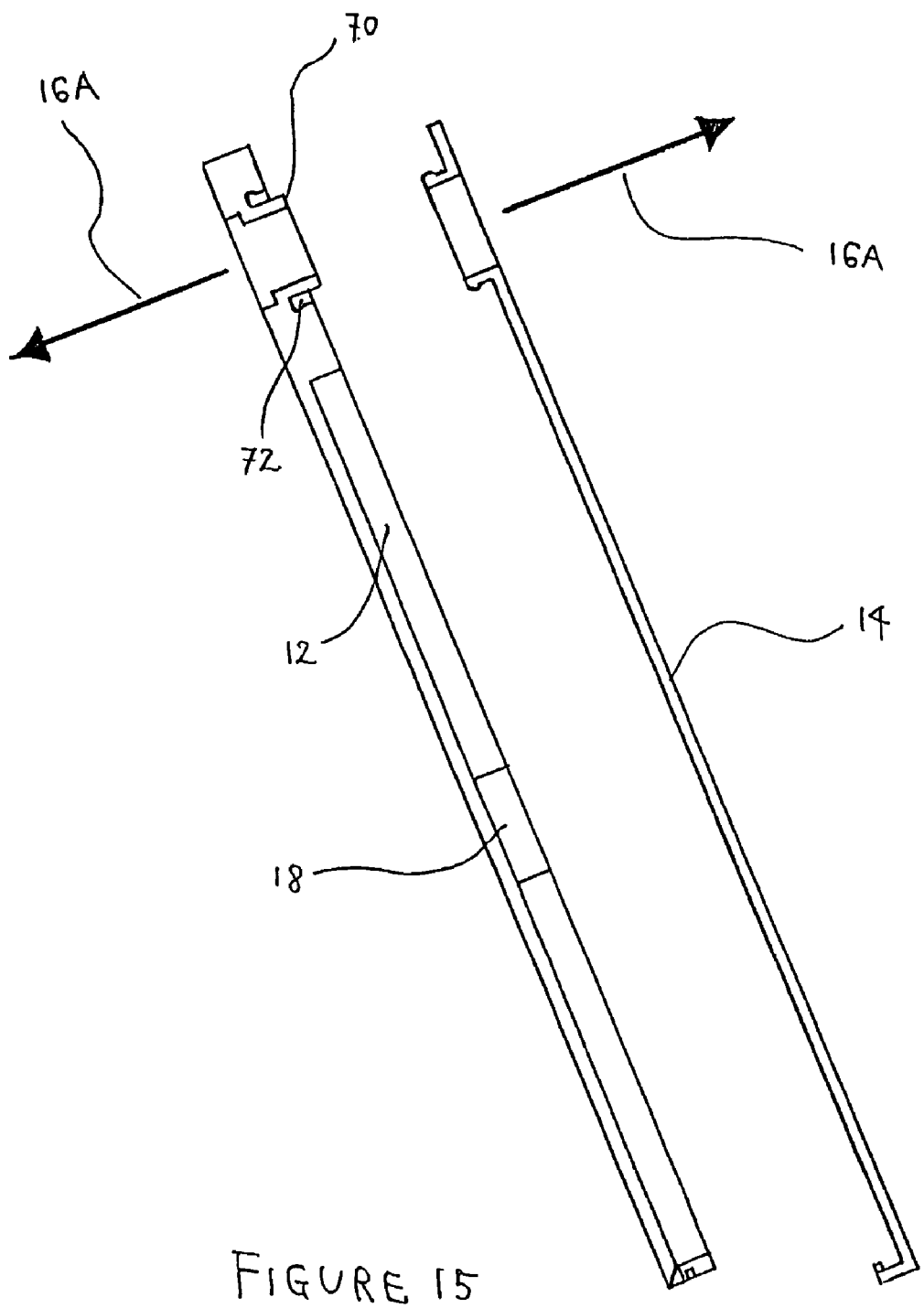
FIG. 15 shows an exploded cross-sectional view of the FIG. 10 container.

As best seen in FIGS. 13A, 13B and 14, the perimeter of base 12 comprises a pair of straight edges 20A and 20B that extend substantially orthogonally from the sides of pivot joint 16. At their distal ends, straight edges 20A and 20B respectively become arcuate edges 22A, 22B, which have a center of curvature located approximately at the center 40 of base 12. Arcuate edges 22A, 22B extend to meet either end of straight edge 24, which forms part of an optional latch mechanism 26 (see FIG. 20 and accompanying discussion below). As shown in FIG. 13B, the bottom side 28 of base 12 may be substantially planar. The upper side of base 12 (FIG. 13A) may comprise a number of features including retainer 18, base plane 30, rail 32 and annular platform 34. The upper side of base 12 (FIG. 13A) also comprises a number of features that form part of pivot joint 16 and latch mechanism 26, which are explained further below. Base 12 may be made from a variety of suitable materials, such as plastic, for example. Base 12 may be transparent, so that the contents of container 10 may be seen through base 12.

Base 12 includes retainer 18, which holds optical disc 100 in place in base 12. In the illustrated embodiment, retainer 18 comprises a plurality of upwardly extending, deflectable retainer members 36A, 36B, 36C, which are spaced apart from one another about the circumference of a circle 38. Circle 38 may be approximately the same size as the central bore 110 of optical disc 100. In operation, optical disc 100 is located above base 12 with its central bore 110 approximately aligned with retainer 18. A user then gently pushes optical disc 100 toward base 12, such that retainer members 36 are deflected inwardly as they slide through the central bore 110 of optical disc 100. The inward deflection of retainer members 36 causes retainer members 36 to exert outward pressure on the rim of central bore 110. This outward pressure holds optical disc 100 in place in base 100.

Those skilled in the art will appreciate that retainer 18 may be implemented via a large number of alternative embodiments (not shown). For example, retainer members 36 may extend inwardly prior to extending upwardly. Additionally or alternatively, one or more of retainer members 36 may comprise an outwardly extending lip (not shown) which helps to hold optical disc 100 in base 12. Additionally or alternatively, retainer 18 may comprise a plurality of upwardly extending, non-deflecting guide rails (not shown) which are interposed between retainer members 36. Such guide rails may have a slightly smaller radius of curvature than retainer members 36, such that the guide rails maintain the position of optical disc 100 within base 12. In general, retainer 18 may comprise any of the different types of optical disc retaining apparatus used with optical disc containers known in the art.

As shown in FIG. 13A, the upper side of base 12 comprises base plane 30. Base plane 30 is partially surrounded by rail 32 which extends upwardly from a perimeter of base plane 30 and which helps to contain and protect optical disc 100 in base 12. Preferably, as shown best in FIG. 14, rail 32 is located around the entire perimeter of base plane 30, except in the region surrounding latch mechanism 26 where there is a gap 42 in rail 32. Gap 42 facilitates handling of optical disc 100 and removal of optical disc 100 from base 12. In alternative embodiments, rail 32 may completely surround base plane 30 or rail 32 may comprise a plurality of spaced apart arcuate sections. In further alternative embodiments, rail 32 is not present and retainer 18 holds optical disc 100 in place in base 12 without the assistance of a rail.

Base 12 may comprise an annular platform 34 which provides a plane that is raised upwardly from base plane 30. When optical disc 100 is held in base 12 by retainer 18, the annular non-data bearing portion 108 of disc 100 rests on annular platform 34, such that the data bearing portion 102 of optical disc 100 is spaced apart slightly from base plane 30. In this manner, annular platform 34 helps to prevent optical disc 100 from being damaged and to prevent the data stored on optical disc 100 from being corrupted. In alternative embodiments of the invention, platform 34 may comprise a plurality of platform elements which are raised from base plane 30. Such platform elements may have a wide variety of shapes, but should be positioned to abut the annular non-data bearing portion 108 of optical disc 100 when it is held in base 12. In other alternative embodiments, platform 34 is not present.

Figure 12A:
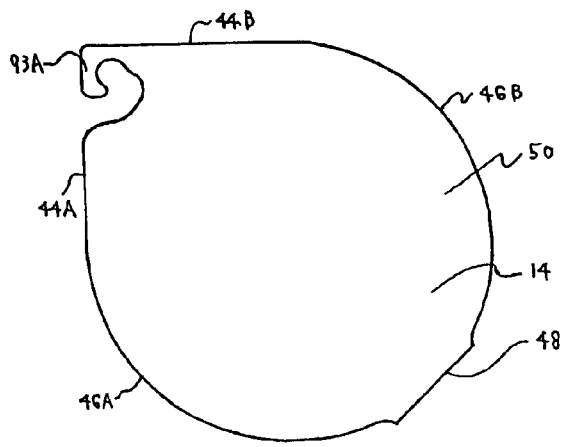
FIGS. 12A and 12B are respectively top and bottom plan views of a lid of the FIG. 10 container.
Figure 12B:
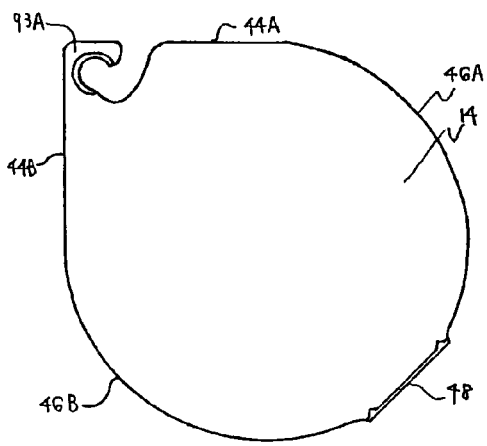

As shown in FIGS. 12A, 12B and 14, the perimeter of lid 14 has a shape similar to that of base 12 with straight edges 44A, 44B extending from the sides of pivot joint 16 to respectively meet arcuate edges 46A, 46B. Arcuate edges 46A, 46B extend to meet either end of straight edge 48, which forms part of a optional latch mechanism 26 (see FIG. 20 and accompanying discussion below). As shown in FIG. 12A, the top side 50 of lid 12 may be substantially planar. The bottom side of lid 14 may comprise a plurality of inwardly extending tabs 52. The bottom side of lid 14 (FIG. 12B) may also comprise a number of features that form part of pivot joint 16 and latch mechanism 26, which are explained further below. Lid 14 may be made from a variety of suitable materials, such as plastic, for example. Preferably, lid 14 is transparent so that the contents of container 10 may be seen through lid 14.

Container 10 may also comprise index label 56 and insert 54 (see FIG. 14). Index label 56 and insert 54 may be made of cardboard, paper, and/or other suitable materials, and may comprise information and/or graphics relating to the data stored on optical disc 100. For example, in the case where optical disc 100 is a CDR, index label 56 and/or insert 54 may contain information about the data recorded on the CDR. Depending on the nature of optical disc 100, index label 56 and/or insert 54 may be blank, such that information may be recorded on index label 56 and/or insert 54 by users. Index label 56 and insert 54 may comprises a single sheet or a plurality of sheets.

Index label 56 may contain adhesive on a bottom side thereof, such that a user may adhere index label 56 to base plane 30 of base 12. Alternatively, index label 56 may be adhered to base plane 30 during fabrication of container 10. In still further alternative embodiments, the bore 58 of index label 56 may form a friction fit with platform 34 of base 12. Index label 56 may also be loose. Inwardly extending tabs 52 on lid 14 may function to hold insert 54 (see FIG. 14). Insert 54 may also be loose.

As shown in FIG. 14, index label 56 may also comprise an outwardly protruding tongue 60, which extends through gap 42 and outwardly beyond flat edge 24 of base 12. Tongue 60 may comprise information about the data stored on optical disc 100. The information located on tongue 60 may be viewed by a user without having to open container 10 or having to view the top or bottom sides of container 10.

Figure 18:
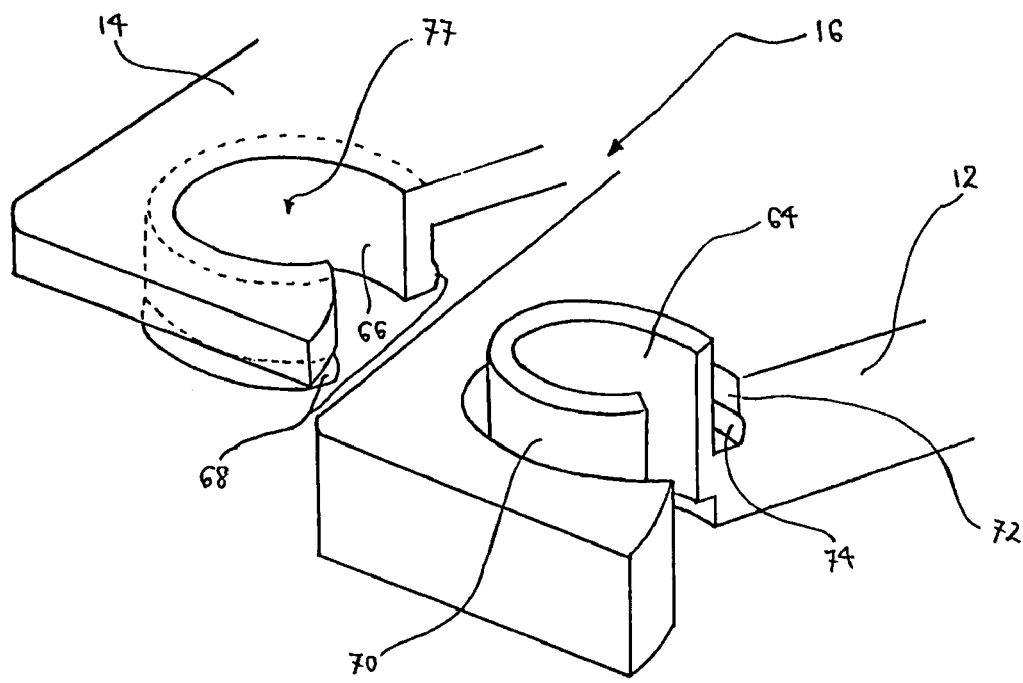
FIG. 18 is a magnified partial isometric view of a pivot joint in accordance with a particular embodiment of the invention.

As discussed above, lid 14 is pivotally coupled to base 12 at pivot joint 16. FIG. 18 shows a magnified view of a pivot joint 16 according to a particular embodiment of the invention. In the illustrated embodiment, pivot joint 16 comprises a semi-annular shaped lid member 66, which extends downwardly from a lower surface of lid 14, a semi-annular shaped base member 70, which extends upwardly from an upper surface of base 12, and a semi-annular groove 72 in the upper surface of base 12. When assembled, semi-annular lid member 66 projects downwardly into groove 72 and semi-annular base member 70 projects upwardly into a semi-circular central bore 77 defined by an inner surface of semi-annular lid member 66. A lower portion of semi-annular lid member 66 fits slidably within groove 72 and an upper portion of semi-annular base member 70 fits slidably against the inner surface of semi-annular lid member 66 to allow pivotal motion of lid 14 with respect to base 16.

In the illustrated embodiment, semi-annular lid member 66 comprises a flange 68 at its lowermost extent and groove 72 comprises a correspondingly shaped notch 74 at its lowermost extent. When container 10 is assembled (i.e. base 12 is coupled to lid 14), flange 68 and notch 74 cooperate to facilitate the pivotal motion of pivot joint 16 and to prevent lid 14 from inadvertently coming apart from base 12. Preferably, as shown in FIG. 18, the transverse extent of flange 68 is relatively small, so that a user can separate lid 14 from base 12, if desired, by deforming one or more of the components of pivot joint 16. Those skilled in the art will appreciate that the location of flange 68 at the downwardmost extent of semi-annular lid member 66 and the location of notch 74 at the downwardmost extend of groove 72 are design choices. The same functionality could be achieved by locating flange 68 and notch 74 at other locations.

Referring to FIGS. 10, 11 and 18, container 10 comprises a hook 62 which may be used to hang container 10 from a rod (not shown) or to otherwise couple container 10 to a rod. In the illustrated embodiment, hook 62 comprises a finger 63, which extends at least partially around a semi-circular bore 64 in pivot joint 16. Semi-circular bore 64 is defined by the inner surface of semi-annular base member 70 of pivot joint 16. The curved shape of finger 63 forms a curved channel 76, which leads from semi-circular bore 64 and opens onto one of the straight edges 20A on the perimeter of container 10. The width of channel 76 may be less than the diameter of bore 64. In particular, the width of channel 76 at the entrance 78 to bore 64 may be less than the diameter of bore 64, such that a rod may cause a slight deformation of the sidewalls of channel 76 when inserted into bore 64. In this manner, a rod may be secured in bore 64 of hook 62 once inserted therein, but will be removable by a user if desired. As shown in FIG. 11, finger 63 may comprise a lid finger member 63A and a base finger member 63B. In alternative embodiments, finger 63 may comprise only lid finger element 63A or only base finger element 63B.

Figure 20B:
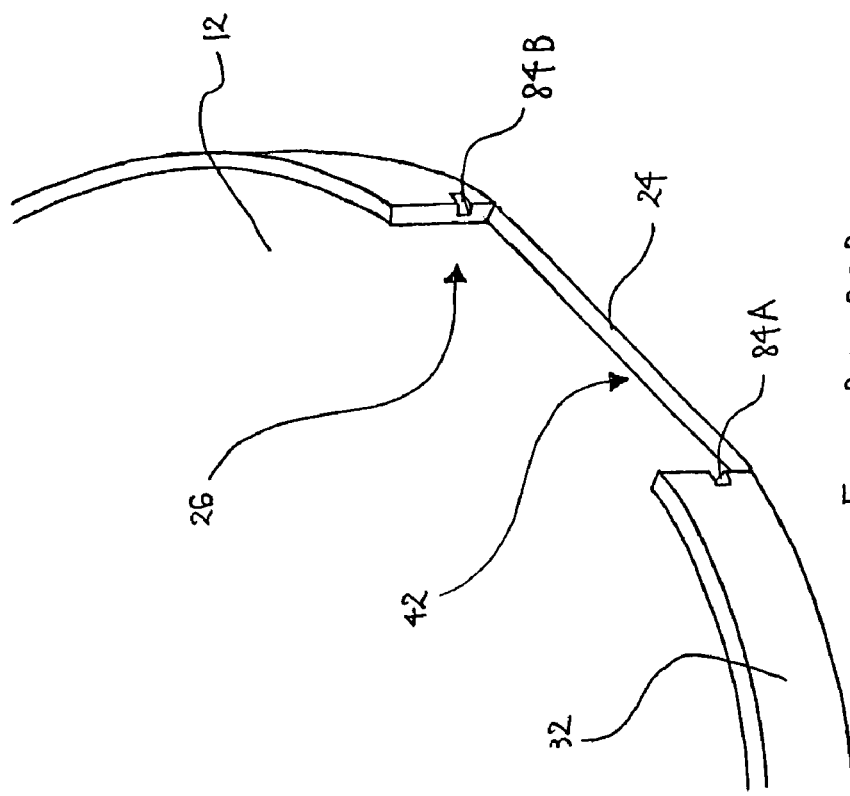
FIGS. 20A and 20B are respectively magnified partial isometric views of the lid and base components of a latch mechanism in accordance with one embodiment of the invention.
Figure 20A:
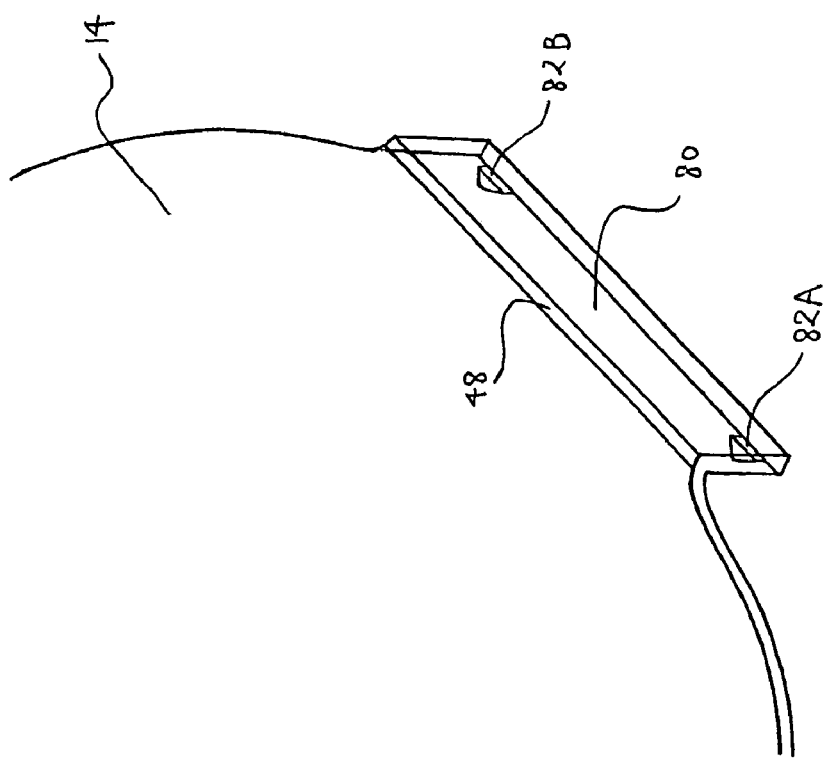

FIGS. 20A and 20B depict a magnified view of a latch mechanism 26 according to a particular embodiment of the invention. Latch mechanism 26 comprises a latch tab 80 which projects downwardly from straight edge 48 of lid 14. Latch tab 80 comprises a plurality of latch protrusions 82 which project inwardly from its inner surface. Latch mechanism 26 also comprises a corresponding plurality of latch indentations 84 in base 12. Latch indentations 84 may be formed in rail 32 of base 12, for example. When container 10 is in its closed configuration, as depicted in FIG. 10, latch protrusions 82 project into latch indentations 84 to maintain the angular position of lid 14 relative to base 16 and to thereby secure container 10 in its closed configuration. In order to open container 10, a user may cause latch tab 80 to deform outwardly by a small amount, disengaging latch protrusions 82 from latch indentations 84 and thereby allowing lid 14 to be pivoted relative to base 12.

Latch mechanism 26 depicted in FIGS. 20A and 20B and discussed above represents only one type of latch mechanism which functions to prevent lid 14 from pivoting relative to base 12. Those skilled in the art will appreciate that there are a variety of mechanisms similar to latch mechanism 26 and that such mechanisms may vary considerably, while achieving the desired functionality. By way of non-limiting examples, a latch mechanism may be located at a different position on a perimeter edge of container 10; a latch mechanism may comprise protrusions and indentations of different shapes or locations; and/or a latch mechanism may comprise different types of fastener(s) altogether.

Figure 19:
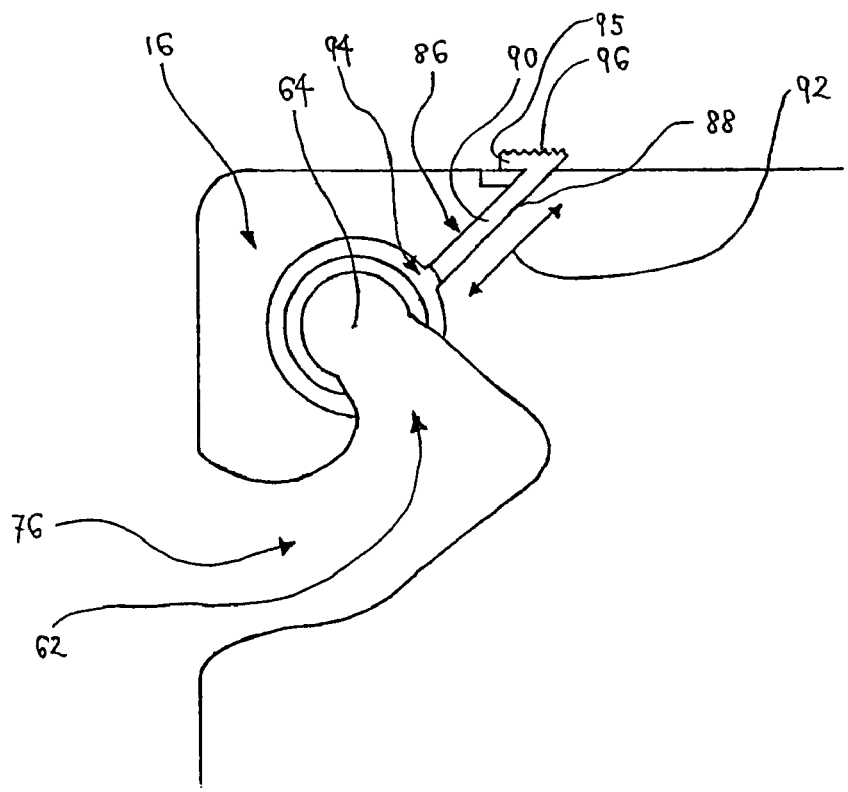
FIG. 19 is a magnified plan view of an optional pivot joint locking mechanism in accordance with a particular embodiment of the invention.

FIG. 19 depicts a magnified plan view of an optional pivot joint locking mechanism 86, which may be used in addition to, or as an alternative to, latch mechanism 26 to prevent lid 14 from pivoting relative to base 12. Locking mechanism 86 comprises a shaft 90, which has a user actuatable end 96 and a distal end 94. A user may push or pull the actuatable end 96 of shaft 90 to slide shaft 90 backward and forward (i.e. in the directions indicated by double-headed arrow 92) within slot 88. The user actuatable end 96 of shaft 90 may comprise a flange 95 which prevents shaft 90 from traveling too far into slot 88. In the illustrated embodiment, shaft 90 and slot 88 are located in base 12. When shaft 90 is fully inserted into slot 88, its distal end 94 interrupts the operation of pivot joint 16. More particularly, the distal end 94 of shaft 90 interrupts the movement of semi-annular lid member 68 within groove 72 (see FIG. 18), thereby preventing the operation of pivot joint 16.

Figure 16:
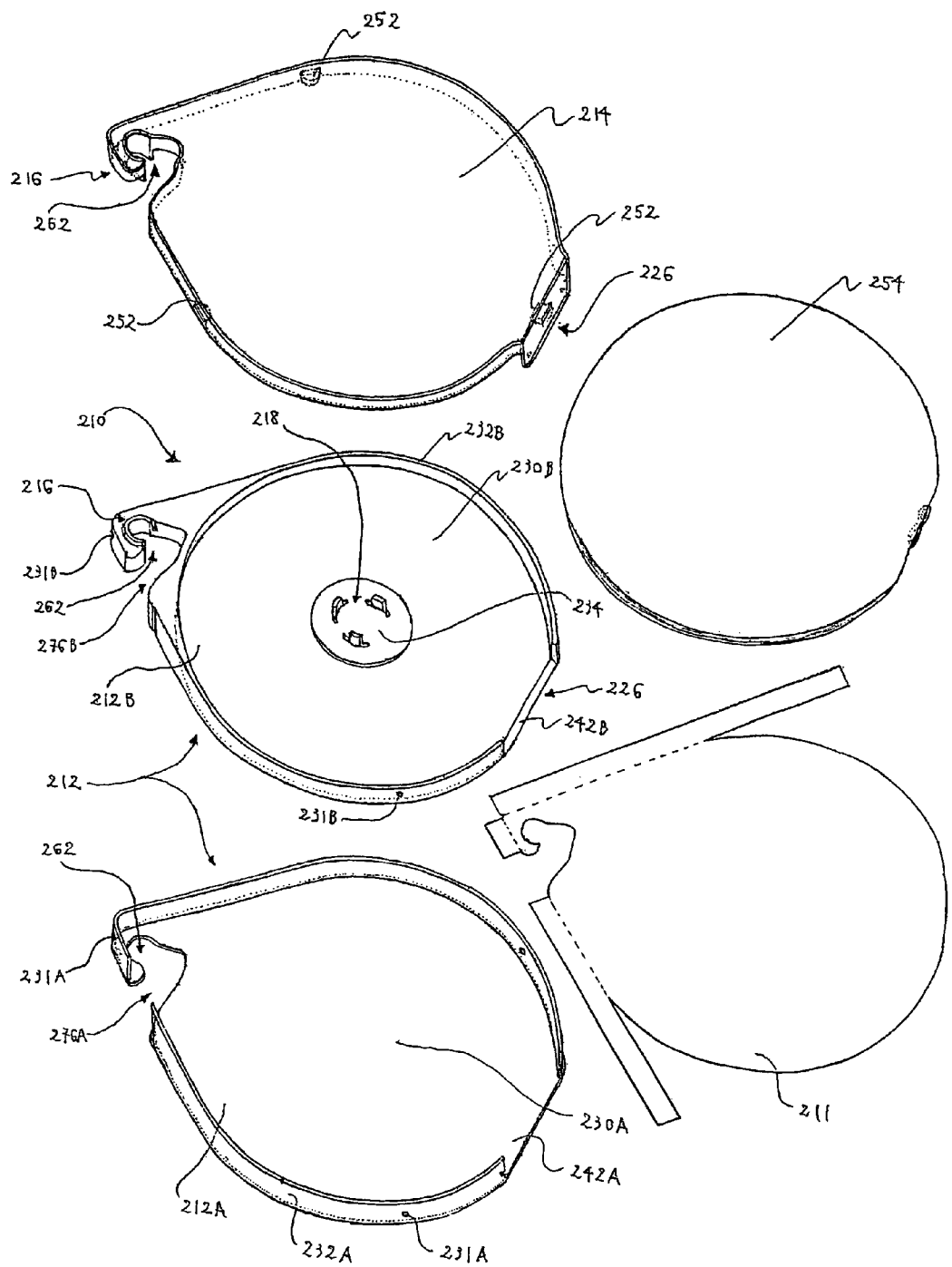
FIG. 16 is an exploded isometric view of an optical disc container according to another embodiment of the invention.

FIG. 16 is an exploded view of an optical disc container 210 according to an alternative embodiment of the invention wherein compound base 212 comprises an intermediate base member 212B which is coupled to lower base member 212A. Container 210 has substantially the same perimeter shape as container 10 described above (see FIG. 14), but container 210 may be slightly thicker from its uppermost surface to its lowermost surface. Container 210 may be used to contain optical discs 100 (FIG. 1) that are prerecorded with media content.

Lower base member 212A comprises a base plane 230A and a rail 232A. In the illustrated embodiment, rail 232A extends upwardly from the perimeter of base plane 230A except in the region of gap 242A, which may be used for a latch mechanism (not shown), and in the channel region 276A for hook 262. Rail 232A may comprise a plurality of inwardly opening indentations 231A which are positioned at spaced apart locations thereon. Intermediate base member 212B fits slidably into lower base member 212A. Intermediate base member 212B comprises a base plane 230B and a rail 232B. In the illustrated embodiment, rail 232B extends upwardly from the perimeter of base plane 230B except in the region of gap 242B, which may be used for the latch mechanism and in the channel region 276B for hook 262. Rail 232B may comprise a plurality of outwardly projecting protrusions 231B which are positioned at spaced apart locations thereon. The upper side of intermediate base member 212B also comprises platform 234 and retainer 218, which may be substantially similar to platform 34 and retainer 18 described above in relation to container 10.

Intermediate base member 212B may be coupled to lower base member 212A to form compound base 212 by inserting intermediate base member 212B into lower base member 212A, such that protrusions 231B project into indentations 231A. Once intermediate base member 212B and lower base member 212A are coupled, compound base 212 functions in a manner substantially similar to base 12 described above in relation to container 10.

Lower base member 212A is preferably made of transparent material, such as clear plastic, for example. Lower label 211 may be inserted between lower base member 212A and intermediate base member 212B. Lower label 211 may be made of cardboard, paper or other suitable materials, and may comprise information and/or graphics relating to the data stored on optical disc 100. For example, in the case where optical disc 100 is a DVD, lower label 211 may contain graphics and information about the video programming stored on the DVD. Depending on the nature of optical disc 100, lower label 211 may be blank, such that information may be recorded thereon.

Lid 214 of container 210 may be substantially the same as lid 14 described above in relation to container 10. The bottom side of lid 214 may comprise tabs 252 which extend inwardly from spaced apart locations on the perimeter of lid 214. Tabs 252 may function to hold insert 254. Tabs 252 and insert 254 may be substantially similar to tabs 52 and insert 54 described above in relation to container 10.

In other respects, container 210 may be substantially similar to container 10 of FIGS. 10-15. In particular, hook 262, pivot joint 216 and latch 226 of container 210 may be substantially similar to hook 62, pivot joint 216 and latch 226 of container 10. Accordingly, the specifics of these components of container 210 are not described further herein.

Figure 17:
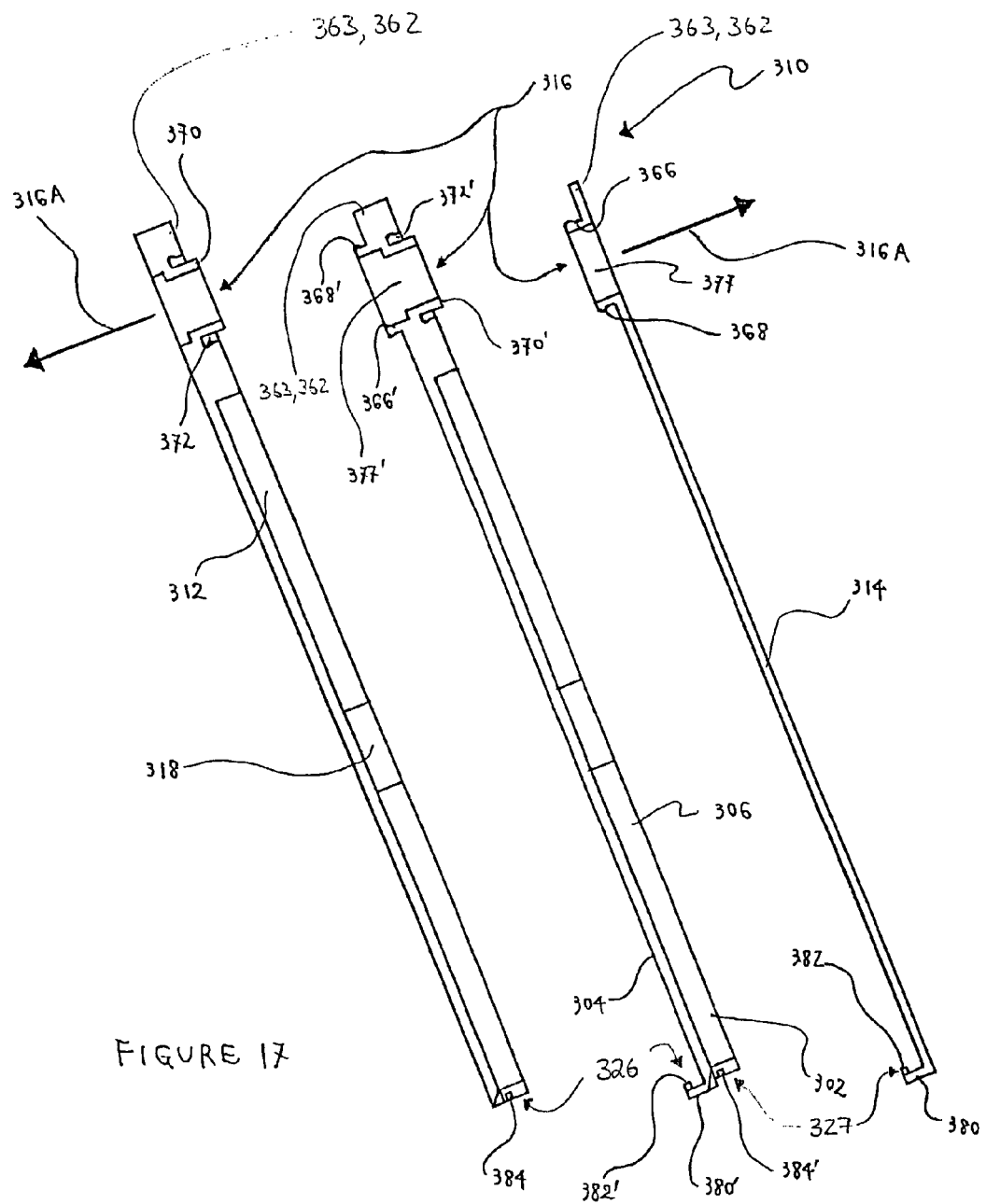
FIG. 17 is an exploded cross-sectional view of a multiple optical disc container according to another embodiment of the invention.

FIG. 17 is a cross-sectional view of a multiple optical disc container 310 according to another alternative embodiment of the invention. Multiple disc container 310 comprises a base 312 and a lid 314 which may be substantially similar to base 12 and lid 14 described above in relation to container 10. Multiple disc container 310 also comprises intermediate member 302. Intermediate member 302 has a bottom side 304, which comprises features which are substantially similar to the bottom side of lid 314, and an upper side 306, which comprises features that are substantially similar to the upper side of base 312. Base 312, lid 314 and intermediate member 302 may be pivotally coupled to one another at pivot joint 316, such that base 312, lid 314 and intermediate member 302 may each independently pivot with respect to one another. When coupled in this manner, a first optical disc (not shown) may be retained between the upper side of base 312 and the bottom side 304 of intermediate member 302 and a second optical disc may be retained between the upper side 306 of intermediate member 302 and the bottom side of lid 314.

Pivot joint 316 allows base 312, lid 314 and intermediate member 302 to independently pivot with respect to one another. The bottom side 304 of intermediate member 302 may comprise pivot joint components that are substantially similar to the pivot joint components of lid 14 of container 10 described above (see FIG. 18). More specifically, the bottom side 304 of intermediate member 302 may comprise a downwardly extending semi-annular member 366', which partially surrounds a perimeter of a semi-circular bore 377' and which may have a flange 368' at its lowermost extent. When intermediate member 302 is coupled to base 312, downwardly extending semi-annular member 366' projects downwardly into groove 372 of base 312 and upwardly extending semi-annular base member 370 projects upwardly into semi-circular bore 377'. Downwardly extending semi-annular member 366' fits slidably within groove 372 and semi-annular base member 370 fits slidably against an inner surface of semi-annular member 366' to allow pivotal motion of intermediate member 302 with respect to base 312. Flange 368' on the lowermost extent of downwardly extending semi-annular member 366' may fit into a correspondingly shaped notch (not shown) in groove 372 to prevent intermediate member 302 from inadvertently coming apart from base 312. If desired, a user may separate base 312 and intermediate member 302 by deforming one or more of semi-annular members 366', 370 or groove 372.

The upper side 306 of intermediate member 302 may comprise pivot joint components that are substantially similar to the pivot joint components of base 12 of container 10 described above (see FIG. 18). More specifically, the upper side 306 of intermediate member 302 may comprise a semi-annular groove 372' and an upwardly extending semi-annular member 370'. When intermediate member 302 is coupled to lid 314, downwardly extending semi-annular lid member 366 projects downwardly into groove 372' and upwardly extending semi-annular member 370' projects upwardly into bore 377 of semi-annular lid member 366. Semi-annular lid member 366 fits slidably within groove 372' and upwardly extending semi-annular member 370' fits slidably against an inner surface of semi-annular lid member 366 to allow pivotal motion of intermediate member 302 with respect to lid 314. Flange 368 on the lowermost extent of semi-annular lid member 366 may fit into a correspondingly shaped notch (not shown) in groove 372' to prevent intermediate member 302 from inadvertently coming apart from lid 314. If desired, a user may separate lid 314 and intermediate member 302 by deforming one or more of semi-annular members 366, 370' or groove 372'.

Container 310 may be provided with an independent latch mechanism 326 between the bottom side 304 of intermediate member 302 and base 312 and an independent latch mechanism 327 between the upper side 306 of intermediate member 302 and lid 314. More particularly, the bottom side 304 of intermediate base member 302 may comprise a downwardly extending latch tab 380' with latch protrusions 382'. Latch tab 380' and latch protrusions 382' may function in a manner substantially similar to latch tab 80 and protrusions 82A, 82B of container 10 (see FIG. 20). Together, latch tab 380' and latch protrusions 382' on the bottom side 304 of intermediate member 302 and latch indentations 384 on base 312 provide a user-openable latch mechanism 326 between base 312 and intermediate member 302. The top side 306 of intermediate base member 302 may comprise a plurality of latch indentations 384'. Latch indentations 384' may function in a manner substantially similar to latch indentations 84A, 84B of container 10 (see FIG. 20). Together, latch indentations 384' on the upper side 306 of intermediate member 302 and latch tab 380 and latch protrusions 382 on lid 314) provide a user-openable latch mechanism 327 between lid 314 and intermediate member 302.

In other respects, container 310 may be substantially similar to container 10 of FIGS. 10-15. In particular, hook 362 of container 310 may be substantially similar to hook 62 of container 10. Finger 363 of hook 362 may comprise a lid finger member, a base finger member and an intermediate finger member. In alternative embodiments, finger 363 may comprise any one or any pair of a lid finger member, a base finger member and an intermediate finger member. The additional specifics of hook 362 are not described further herein.

Those skilled in the art will appreciate that container 310 is not limited to having a single intermediate member 302. Container 310 may comprise a plurality of intermediate members 302 to provide a container capable of housing a plurality of optical discs. For example, container 310 may comprise two intermediate members 302', 302" interposed between lid 314 and base 312. Such an embodiment is capable of housing three optical discs.

As will be apparent to those skilled in the art in the light of the foregoing disclosure, many alterations and modifications are possible in the practice of this invention without departing from the spirit or scope thereof. For example:

- Containers 10, 210, 310 respectively comprise hooks 62, 262, 362. Accordingly, they may be coupled to rods (not shown) in a manner similar to container 1 (FIG. 3). As such, containers 10, 210, 310 may be used together with any of the storage and transport apparatus depicted in FIGS. 4-9. In general, containers 10, 210, 310 may be used together with any storage and transport apparatus comprising one or more rods to which the containers may be coupled.
- Pivot joint 16 depicted in FIG. 18 and the other illustrated embodiments represents only one possible type of pivot joint. Those skilled in the art will appreciate that there are a wide variety of pivot joints that could provide the same functionality as that of the illustrated embodiments. The invention should be understood to include any pivot joint which allows pivotal motion of lid 14 with respect to base 12. Preferably, such pivot joints comprise a bore within their perimeters and the channel 76 of hook 62 terminates in this bore.
- In the illustrated embodiments, hook 62 is located in a corner of container 10 and comprises a channel 76 that terminates at semi-circular bore 64. Bore 64 is formed by an inner surface of semi-annular base member 70 of pivotal joint 16. In alternative embodiments, hook 62 may be located in different parts of container 10. For example, hook 62 may be formed in a different corner or on a side of container 10.
- Pivot joint 16 is described and depicted (see FIG. 18) as having certain components in lid 14 (i.e. semi-annular lid member 66, flange 68, and bore 77) and other components in base 12 (i.e. semi-annular base member 70, groove 72, notch 74 and bore 64). Those skilled in the art will appreciate that a pivot joint may also be formed by interchanging the joint components on lid 14 and the joint components on base 12.
- Bore 64 of hook 62 and pivot joint 16 are described and depicted as being semi-circular in shape. In alternative embodiments, the interior surface of bore 64 may have other shapes. For example, the interior surface of bore 64 may be shaped to allow coupling of hook 62 to rods which have a different shape.

FIG. 21 depicts a container 510 according to another alternative embodiment of the invention. In FIG. 21, container 510 is in a partially open configuration. An optical disc 100 may be housed in container 510 in a space 513 between base 512 and lid 514. As with the previously described embodiments, base 512 is pivotally coupled to lid 514 at pivot joint 516, which allows lid 514 to pivot relative to base 512 about a pivot axis that is substantially orthogonal to the page. Pivot joint 516 of container 510 may generally be any type of pivot joint. Container 510 comprises other features similar to those of container 1 (FIG. 2) and container 10 (FIGS. 10–15). However, hook 562 of container 510 is formed from a separate hook member 561 which extends outwardly from at least one of base 512 and lid 514. Preferably, but not necessarily, hook member 561 may be coupled to pivot joint 516 such that it may pivot about the pivot axis with respect to base 512 and/or lid 514.

Accordingly, the scope of the invention is to be construed in accordance with the substance defined by the following claims.

What is claimed is:

1. A container for housing optical discs, the container comprising:
   a base;
   a lid coupled to the base by a pivot joint for releasably housing an optical disc between the base and the lid, the pivot joint permitting pivotal motion of the lid relative to the base about a pivot axis that is substantially orthogonal to a plane of the disc housed between the base and the lid; and
   a hook having an open end for removably coupling the container to a rod;
   wherein the base comprises a generally flattened base portion disposed to protect a first planar surface of the disc housed between the base and the lid and the lid comprises a generally flattened lid portion disposed to protect a second, opposing planar surface of the optical disc housed between the base and the lid;
   wherein the hook is formed on a perimeter of both the base and the lid; and
   wherein the hook comprises a finger that extends at least partially around the pivot axis.

2. A container according to claim 1 wherein an edge of the finger defines at least a portion of an inwardly extending channel which leads towards the pivot joint and terminates in a bore located within the pivot joint.

3. A container according to claim 2 wherein the bore comprises an edge that is semi-circular in shape.

4. A container according to claim 2 wherein a width of the bore is greater than a width of the channel immediately outside of the bore.

5. A container for housing optical discs, the container comprising:
   a base;
   a lid coupled to the base by a pivot joint for releasably housing an optical disc between the base and the lid, the pivot joint permitting pivotal motion of the lid relative to the base about a pivot axis that is substantially orthogonal to a plane of the disc housed between the base and the lid; and
   a hook having an open end for removably coupling the container to a rod;
   wherein the base comprises a generally flattened base portion disposed to protect a first planar surface of the disc housed between the base and the lid and the lid comprises a generally flattened lid portion disposed to protect a second, opposing planar surface of the optical disc housed between the base and the lid;
   wherein the hook is formed by a perimeter edge of at least one of the base and the lid; and
   wherein the hook comprises a finger that extends at least partially around the pivot axis.

6. A container according to claim 5 wherein an edge of the finger defines at least a portion of an inwardly extending channel which leads towards the pivot joint and terminates in a bore in the center of the pivot joint.

7. A container according to claim 6 wherein the bore comprises an edge that is semi-circular in shape.

8. A container according to claim 6 wherein a width of the bore is greater than a width of the channel immediately outside of the bore.

9. A container according to claim 8 wherein the pivot joint comprises a semi-annular lid member which extends from the lid in a direction parallel to the pivot axis and a semi-annular base member that extends from the base in a direction parallel to the pivot axis, the semi-annular lid and base members slidably coupled to one another to enable pivotal movement of the lid relative to the base about the pivot axis, wherein the pivot joint comprises a bore through a center thereof, an edge of the bore being semi-circular in shape and formed by the semi-annular lid member and wherein the lid comprises a semi-annular groove which receives the semi-annular base member.

10. A container according to claim 9 wherein the semi annular groove comprises a notch on a side thereof, the semi-annular base member comprises a flange on a side thereof, and the flange is received in the slot for preventing the lid from inadvertently coming apart from the base.

11. A container according to claim 5 comprising a latch mechanism for maintaining the lid in a closed pivotal orientation with respect to the base.

12. A container according to claim 11 wherein the latch mechanism comprises one or more protrusions on the lid which project into one or more corresponding indentations on the base when the lid is in the closed pivotal orientation.

13. A container according to claim 11 wherein the latch mechanism comprises one or more protrusions on the base which project into one or more corresponding indentations on the lid when the lid is in the closed pivotal.

14. A container according to claim 5 comprising a pivot joint locking mechanism for preventing pivotal movement of the lid with respect to the base.

15. A container according to claim 14, wherein the pivot joint locking mechanism comprises a shaft, which is slideable to a locking position where a portion of the shaft projects into the pivot joint to prevent pivotal movement of the lid with respect to the base.

16. A container according to claim 5 wherein the perimeter of the base and the perimeter of the lid each comprise at least two straight edge portions and at least one arcuate edge portion.

17. A container according to claim 16 wherein the two straight edge portions are aligned substantially orthogonally to one another.

18. A container according to claim 5 wherein the base comprises a retainer for releasably holding the optical disc against a surface thereof.

19. A container according to claim 18 wherein the retainer comprises a plurality of deformable members which project through a hole in the optical disc and which provide pressure against an edge of the hole to hold the optical disc against the surface of the base.

20. An apparatus for storing or transporting one or more optical discs, the apparatus comprising a rod and one or more containers according to claim 5, wherein the hook of the one or more optical disc containers is mountable to the rod.

21. A container for housing optical discs, the container comprising:
  a base;
  a lid coupled to the base by a pivot joint for releasably housing an optical disc between the base and the lid, the pivot joint permitting pivotal motion of the lid relative to the base about a pivot axis that is substantially orthogonal to a plane of the disc housed between the base and the lid; and
  a hook having an open end for removably coupling the container to a rod;
  wherein the base comprises a generally flattened base portion disposed to protect a first planar surface of the disc housed between the base and the lid and the lid comprises a generally flattened lid portion disposed to protect a second, opposing planar surface of the optical disc housed between the base and the lid;
  wherein the pivot joint comprises a semi-annular lid member which extends from the lid in a direction parallel to the pivot axis and a semi-annular base member that extends from the base in a direction parallel to the pivot axis, the semi-annular lid and base members slidably coupled to one another to enable pivotal movement of the lid relative to the base about the pivot axis.

22. A container according to claim 21 wherein the pivot joint comprises a bore through a center thereof, an edge of the bore formed by one of: the semi-annular base member and the semi-annular lid member.

23. A container according to claim 22 wherein the edge of the bore is semi-circular in shape.

24. A container according to claim 23 wherein the edge of the bore is formed by the semi-annular base member and wherein the base comprises a semi-annular groove which receives the semi-annular lid member.

25. A container according to claim 24 wherein the semi-annular groove comprises a notch on a side thereof, the semi-annular lid member comprises a flange on a side thereof, and the flange is received in the slot for preventing the lid from inadvertently coming apart from the base.

26. A container according to claim 23 wherein the edge of the bore comprises an opening that leads to a curved channel, the channel extending outwardly towards a perimeter edge of the container.

27. A container for housing optical discs, the container comprising:
  a base;
  a lid coupled to the base by a pivot point for releasably housing an optical disc between the base and the lid, the pivot joint permitting pivotal motion of the lid relative to the base about a pivot axis that is substantially orthogonal to a plane of the disc housed between the base and the lid; and
  a hook having an open end for removably coupling the container to a rod;
  wherein the base comprises a generally flattened base portion disposed to protect a first planar surface of the disc housed between the base and the lid and the lid protect a second, opposing planar surface of the optical disc housed between the base and the lid;
  wherein the pivot joint comprises a semi-annular lid member which extends from the lid in a direction parallel to the pivot axis and a semi-annular base member that extends from the base in a direction parallel to the pivot axis, the semi-annular lid and base members slidably coupled to one another to enable pivotal movement of the lid relative to the base about the pivot axis;
  wherein the pivot joint comprises a bore through a center thereof, an edge of the bore formed by one of; the semi-annular base member and the semi-annular lid member; and
  wherein the hook comprises a finger that extends at least partially around the pivot axis.

28. A container according to claim 27 wherein an edge of the finger defines at least a portion of an inwardly extending channel which leads towards the pivot joint and terminates in the bore in the center of the pivot joint.

29. A container according to claim 28 wherein a width of the bore is greater than a width of the channel immediately outside of the bore.

30. A container for housing substantially planar optical discs, the container comprising:
  a base having a base finger on its perimeter;
  a lid pivotally coupled to the base by a pivot joint for housing an optical disc between the base and the lid, the lid having a lid finger on its perimeter;
  wherein the base finger and lid finger form a hook having an open end for removably coupling the container to a rod, wherein the pivot joint permits pivotal motion of the lid relative to the base about a pivot axis that is substantially orthogonal to a plane of the disc housed between the base and the lid and wherein the base comprises a generally flattened base portion disposed to protect a first planar surface of the disc housed between the base and the lid and the lid comprises a generally flattened lid portion disposed to protect a second, opposing planar surface of the optical disc housed between the base and the lid.

31. A container according to claim 30 wherein the base finger defines a curved base channel that extends inwardly toward an interior of the base and the lid finger defines a curved lid channel that extends inwardly toward an interior of the lid.

32. A container according to claim 31 wherein the inwardmost edge of the lid channel and the inwardmost edge of the base channel form a bore located within the pivot joint.

* * * * *